United States Patent Office 3,486,859
Patented Dec. 30, 1969

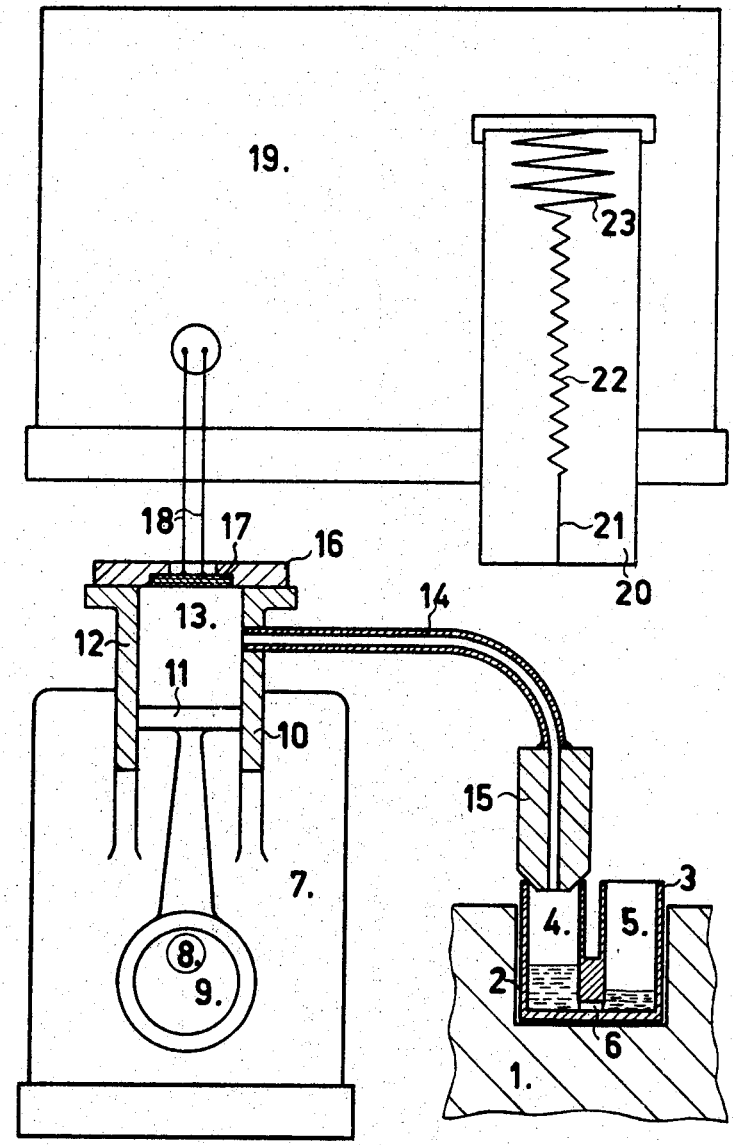

3,486,859
BLOOD ANALYZING METHOD AND APPARATUS
Rudolf Greiner, Langenthal, and Manuel Sanz, Chambesy, Switzerland, assignors to Greiner Electronic A.G., Langenthal, Switzerland, a corporation of Switzerland
Filed Sept. 8, 1967, Ser. No. 666,364
Claims priority, application Switzerland, Oct. 11, 1966, 14,641/66
Int. Cl. G01n *33/16*
U.S. Cl. 23—230          8 Claims

ABSTRACT OF THE DISCLOSURE

Blood analyzing method and apparatus, including a double-armed holder having blood and liquid reactant chambers in communication via a small capillary conduit. Air pump means are provided for applying pressure changes to one of the chambers to effect periodic mixing of the liquids via the capillary conduit, and indicator means are included for detecting the progressive restriction of the capillary conduit upon coagulation of the blood.

---

For the conduction of blood analysis, it is important to know the coagulation time of the blood liquid, which, under normal circumstances, is about five or six minutes. In order to reduce the tedious blood measurement periods, it has been proposed to mix with the blood a blood-coagulating reactant, which reactant is operable, when of the proper composition and mixing proportions, to reduce the coagulation time to approximately ten seconds. A certain amount of time elapses between the withdrawal of the blood and the measuring of the coagulation time, and therefore an anti-coagulant such as, for example, a sodium citrate or oxalate composition—is often added, so that the coagulation effects are neutralized. In the event that a shorter coagulation time is now desired, a reaction agent is mixed with the blood to terminate the effect of the anti-coagulant and simultaneously also reduce the coagulation time of the mixture to approximately ten to twenty seconds. In each case, the coagulation time must be determined with the mixture maintained at a constant temperature (at least 37° centigrade) and consequently it is desirable to insert a probe housing containing the mixture into a temperature regulated heating plate.

By a known method, a substantially cylindrical probe housing is used, in which the blood liquid and the reaction liquid are introduced by pipette in a prescribed mixing ratio. A plunger body having a torsion suspension is inserted within the mixture and is slowly rotated, the coagulation time point of the blood mixture being noted through the determination of the resulting dying out of the plunger body movement.

A further known blood analyzing method makes use of a two-armed probe body having a pair of chambers joined by a wide overflow groove. Blood and a liquid reaction agent are respectively introduced by pipette into the chambers in such a manner that the fluids in the two chambers are not quite able to be mixed via the horizontal position of the overflow groove. When the probe is mounted on a pivot arm and is subjected to periodic tilting movement, the two liquids are mixed by reciprocation between the chambers. The commencement of coagulation of the blood is ascertained electrically by means of contact electrodes.

These and other methods generally require probe housings of fairly large size because of purely geometrical reasons, since approximately 100 cubic millimeters of blood and twice as much reactant liquid are necessary to conduct the blood analysis tests. Another drawback is that the plunger body, contact electrodes and probe housing require careful cleaning after each measurement. While cleaning may be avoided by using new components following each test, the proper substitution of such components requires a degree of care and skill, and is tedius and time consuming.

The primary object of the present invention is to provide a blood analyzing method and apparatus in which blood and the reaction liquid are introduced by pipette into a pair of separate chambers joined by a capillary conduit, the time between the initiation of mixing the liquids via the capillary conduit and the coagulation of the blood being a characteristic factor of the blood. In accordance with the invention, ultra microanalysis is possible and a succession of blood tests may be conducted without time consuming and critical preliminary preparation. This is achieved, in accordance with the present invention, by connecting with at least one chamber of the probe that periodically imparts pressure impulses to one of the fluids to effect mixing thereof with the other fluid via the capillary conduit as well as a periodic level change in each chamber. Upon coagulation of the blood, the flow through the capillary conduit is restricted, and the amplitude of the pressure and level changes are varied. By measuring the number of pumping cycles required to coagulate the blood, the coagulation time may be readily determined to present a factor characteristic of the blood under test.

Other objects and advantages of the invention will become apparent from a study of the following specification when considered in connection with the accompanying drawing, in which the single figure is a somewhat diagrammatic elevational view—with certain parts broken away—of the blood analyzing apparatus of the present invention.

Referring to the drawing, a heating plate 1 is provided having a recess 2 for receiving the probe housing 3 to maintain the same at a desired constant temperature (for example, 37° centigrade). The probe housing is divided into two parts containing chambers 4 nd 5, respectively, that are connected via capillary conduit 6. Each chamber is cylindrical and has a volume of approximately 100 rubic millimeters and a diameter of between 3.5 and 4.0 millimeters. The capillary conduit has a diameter of approximately 0.7 millimeters. The probe body 3 is preferably formed of a synthetic plastic material—such as polyethylene—that is repellent to the blood and reactant fluids, and also results in a simple and inexpensive probe body structure. Owing to its relatively low cost, the body is disposable following a single usage, whereby cleaning and washing are eliminated.

As shown in the drawing, a synchronous motor 7 is provided having a shaft 8 that rotates cam 9 to reciprocate a piston 11 in the cylinder 12. The piston and cylinder define an air pump 10 which periodically pumps pressure air into chamber 4 via conduit 14 and nozzle 15. The motor 7 rotates at one cycle per second, so that the liquid in chamber 4 is subjected to one gas pressure impulse each second. The nozzle 15 is so designed that it may be removed from the chamber 4 and placed in direct communication with chamber 5. In the illustrated embodiment, when one chamber is pressured by the air pump means, the other chamber is open to atmosphere.

In the upper portion of the wall of pump chamber 13 is mounted a piezoelectric pressure cell 17 having terminals connected by conductors 18 with a conventional voltage-responsive recording apparatus 19. As the pressure in chamber 13 (and consequently, in chamber 4) builds up upon upward movement of piston 11 in cylinder 12, an electrical voltage is developed by the piezoelectric component that is amplified by the recorder 19 and is recorded on the visible record 20. The recorder 19 is conventional in the art and need not be described in detail.

In operation, assume that 20 cubic millimeters of blood and 40 cubic millimeters of reactant liquid are inserted by pipette within chambers 5 and 4, respectively, and that the nozzle 15 is mounted upon the upper end of chamber 4 as shown in the drawing. Prior to energization of the synchronous motor 7, the piezoelectric detector 17 is not subjected to pressure change, and consequently a straight line 21 is formed on the paper record 20 by the stylus of the recorder 19. Upon activation of the motor 7, with the first upward stroke of the piston 11, the pressure in chambers 13 and 4 builds up so that some of the liquid in chamber 4 is forced through the capillary conduit 6 into chamber 5 for mixing with the fluid thereof. During the cyclic reciprocation of piston 11 within cylinder 12, level changes occur in the liquids in chambers 4 and 5, and the amplitudes of the pressure changes are recorded on the paper record 20 in the form of the waveform line 22. During reciprocation of the piston 11, successive peaks are indicated on the line 22 of record 20, and progressive mixing of the fluids is accomplished via the capillary conduit 6, until coagulation of the blood is achieved by the reactant liquid. Owing to this coagulation, the capillary passage 6 becomes restricted, and the pressure in chambers 4 and 13 increase, whereupon a higher voltage is generated by piezoelectric device 17, and peaks 23 of greater amplitude are recorded on the paper record 20. The measurement is ended, the recorder is de-activated, and the paper strip 20 is then torn off. By counting the 1 second peaks of record 22 between the initiation of mixing (as evidenced by the junction of recording patterns 21 and 22) and the commencement of coagulation (as indicated by the junction between recorder read-out lines 22 and 23), the coagulation time may be quickly and accurately determined. In the illustrated example, the coagulation time for the blood was thirteen seconds, which time therefor is characteristic of the blood when mixing in given predetermined proportions with the blood coagulating reactant liquid. No cleaning of the disposable probe body is required. Owing to the improved apparatus, quick trouble-free analysis of small quantities of blood may be readily accomplished.

Of course, in accordance with the present invention, instead of using a recorder 19 that provides a visible record 20, other means for indicating voltage peaks or pressure impulses might be used as well. It is conceivable that other means—such as level-responsive optical or photoelectric means—might be provided for counting the number of strokes of the air pump that are required to effect coagulation of the sample under test.

What is claimed is:

1. Blood analyzing apparatus, comprising
   a probe housing containing a pair of chambers in communication via a capillary conduit, said chambers being adapted to receive liquid blood and a liquid blood-coagulating reactant, respectively;
   gas pump means for cyclically pressurizing at least one of said chambers to effect periodic mixing, via said capillary conduit, of fluids contained in said chambers, respectively;
   and means for detecting the fluid flow restriction of said conduit upon coagulation of the blood by said reactant, whereby the number of pressure impulse cycles required to effect the said coagulation is a factor characteristic of the blood under test.

2. Apparatus as defined in claim 1, wherein the period of each cycle of pressurization by said pump means is one second.

3. Apparatus as defined in claim 2, wheerin one of said chambers is vented to atmosphere and wherein the other of said chambers is in direct communication solely with said pump means.

4. Apparatus as defined in claim 3, wherein the detector means is responsive to the amplitudes (22, 23) of the pressure changes of the fluid in one of said chambers before and after coagulation of the blood, respectively.

5. Apparatus as defined in claim 4, wherein said detector means includes means (17) for generating voltage signals as a function of the cyclic pressure changes of the gaseous fluid pumped to said one chamber, and recorder means for visually recording the peak amplitudes of said voltage signals.

6. Apparatus as defined in claim 1, wherein said housing is formed of a material repellant to said blood and reactant liquids.

7. Apparatus as defined in claim 1, and further including means for heating said probe head to maintain the same at a given uniform temperature.

8. The method of analyzing blood, comprising the steps of
   connecting measured quantities of liquid blood and a liquid blood-coagulating reactant via a capillary conduit;
   applying cyclic gaseous pressure impulses to one of said quantities to effect mixing of the quantities adjacent said conduit;
   and monitoring the pressure of said gaseous impulses to detect a sudden increase of the amplitude thereof upon coagulation of the blood and restriction of the capillary conduit, wherein the number of impulses required to effect coagulation is a factor of the blood being analyzed.

References Cited

UNITED STATES PATENTS 2,952,152  9/1960  Fisher et al. _____ 73—64.1 XR

MORRIS O. WOLK, Primary Examiner

R. M. REESE, Assistant Examiner

U.S. Cl. X.R.

23—253; 73—64.1